(12) United States Patent
Raneri

(10) Patent No.: US 7,800,319 B2
(45) Date of Patent: Sep. 21, 2010

(54) LIGHTING CONTROL SYSTEM HAVING A SECURITY SYSTEM INPUT

(75) Inventor: Daniel Curtis Raneri, Bethlehem, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 180 days.

(21) Appl. No.: 11/804,257

(22) Filed: May 17, 2007

(65) Prior Publication Data

US 2008/0284347 A1    Nov. 20, 2008

(51) Int. Cl.
*H05B 37/00* (2006.01)
*H04B 3/36* (2006.01)

(52) U.S. Cl. .................... 315/312; 340/425.1

(58) Field of Classification Search .......... 315/120, 315/121–122, 125, 127–132, 133, 312, 185 S, 315/32, 34, 35, 149, 158, 159; 340/291, 340/292, 287, 425.2, 392.2, 392.3, 425.1; 445/6

See application file for complete search history.

(56) References Cited

U.S. PATENT DOCUMENTS

| | | | |
|---|---|---|---|
| 3,581,208 A | 5/1971 | Buehrle, Jr. et al. | |
| 3,611,363 A | 10/1971 | McCrea et al. | |
| 3,787,867 A | 1/1974 | Dodge et al. | |
| 4,019,142 A | 4/1977 | Wycoff | |
| 4,322,632 A | 3/1982 | Hart et al. | |
| 4,470,041 A | 9/1984 | Sutherland et al. | |
| 4,684,822 A | 8/1987 | Angott | |
| 4,686,380 A | 8/1987 | Angott | |
| 5,736,965 A | 4/1998 | Mosebrook et al. | |
| 5,838,226 A | 11/1998 | Houggy et al. | |
| 5,848,054 A | 12/1998 | Mosebrook et al. | |
| 5,905,442 A * | 5/1999 | Mosebrook et al. | 340/3.7 |
| 5,982,103 A | 11/1999 | Mosebrook et al. | |
| 6,033,365 A | 3/2000 | von Zitzewitz | |
| 6,100,659 A | 8/2000 | Will et al. | |
| 6,201,364 B1 | 3/2001 | Will et al. | |
| 6,310,549 B1 * | 10/2001 | Loftin et al. | 340/547 |
| 6,687,487 B1 | 2/2004 | Mosebrook et al. | |

(Continued)

OTHER PUBLICATIONS

Lutron Electronics Co., Inc., Homeworks Technical Reference Guide, Rev. G, Feb. 2005, front cover, pp. 1-20, 135-143, rear cover.

*Primary Examiner*—Douglas W Owens
*Assistant Examiner*—Minh D A
(74) *Attorney, Agent, or Firm*—Mark E. Rose; Philip N. Smith

(57) ABSTRACT

A lighting control system is operable to be coupled to a security system and is pre-programmed such that the control devices of the lighting control system behave out-of-box in a predetermined manner in response to the security system. The lighting control system comprises a contact closure input that is operable to be simultaneously coupled to both a momentary contact closure output and a maintained contact closure output of the security system. Preferably, the lighting control system enters a first mode of operation when the contact closure input detects a closure, enters a second mode of operation if the contact closure input continues to detect the closure after a predetermined amount of time, and enters a third mode of operation if the contact closure input no longer closed. Accordingly, the lighting control system is responsive to either the momentary contact closure output or the maintained contact closure output.

26 Claims, 5 Drawing Sheets

U.S. PATENT DOCUMENTS

| | | |
|---|---|---|
| 6,803,728 B2 | 10/2004 | Balasubramaniam et al. |
| 6,917,167 B2 * | 7/2005 | Courtney et al. ............ 315/318 |
| 6,983,783 B2 | 1/2006 | Carmen, Jr. et al. |
| 7,085,627 B2 | 8/2006 | Bamberger et al. |
| 7,126,291 B2 * | 10/2006 | Kruse et al. ................. 315/316 |
| 7,228,429 B2 | 6/2007 | Monroe |
| 7,391,297 B2 | 6/2008 | Cash et al. |
| 7,498,952 B2 | 3/2009 | Newman, Jr. |
| 2001/0045897 A1 | 11/2001 | Wolff |
| 2005/0113157 A1 | 5/2005 | Jaakola |
| 2006/0087405 A1 | 4/2006 | Koike et al. |
| 2006/0273970 A1 | 12/2006 | Mosebrook et al. |
| 2006/0284734 A1 * | 12/2006 | Newman, Jr. ............... 340/825 |
| 2008/0067871 A1 | 3/2008 | Black et al. |
| 2008/0111491 A1 * | 5/2008 | Spira ......................... 315/158 |

\* cited by examiner

LIGHTING CONTROL SYSTEM HAVING A SECURITY SYSTEM INPUT

BACKGROUND OF THE INVENTION

1. Field of the Invention

The present invention relates to a load control system comprising a plurality of load control devices for controlling the amount of power delivered to a plurality of electrical loads from an alternating-current (AC) power source, and more particularly, to a simple lighting control system operable to receive a contact closure input from a security system, wherein the lighting control system is pre-configured to respond to the contact closure input from the security system.

2. Description of the Related Art

Typical load control systems are operable to control the amount of power delivered to an electrical load, such as a lighting load or a motor load, from an alternating-current (AC) power source. A load control system generally comprises a plurality of control devices coupled to a communication link (e.g., a wireless or a wired communication link) to allow for communication between the control devices. The control devices of a lighting control system include load control devices, such as dimmers, which are operable to control the amount of power delivered to the loads in response to digital messages received across the communication link or local inputs, such as user actuations of a button. Further, the control devices of a lighting control system often include one or more keypads or contact closure input devices, which both transmit commands across the communication link to control the loads coupled to the load control devices. An example of a lighting control system is described in greater detail in commonly-assigned U.S. Pat. No. 6,803,728, issued Oct. 12, 2004, entitled SYSTEM FOR CONTROL OF DEVICES, the entire disclosure of which is hereby incorporated by reference.

Many prior art lighting control systems have offered an advanced set of features to end users. The Homeworks® residential lighting control system, manufactured by the assignee of the present invention, allows homeowners to easily control the lighting loads in their homes to operate in a desired fashion. Homeowners may control a plurality of lighting loads together from a single master keypad. The Homeworks lighting control system includes a timeclock, such that the lighting loads may be controlled automatically, for example, to simulate occupancy while the homeowners are away. The Homeworks lighting control system may also be integrated with other residential control systems, such as security systems. For example, the lighting control system may be programmed to turn all of the lights on inside the house and flash the outside lights in the event of an intrusion. Further, in the event of a fire, the lighting control system may flash the outside lights, while keeping the interior lights at a dim level (since bright lights in combination with smoke can cause a fog-like blinding effect).

To interface to the lighting control system, the security system comprises a plurality of contact closure outputs. Accordingly, the lighting control system comprises a plurality of contact closure inputs for receipt of contact closure output signals from the contact closure outputs, with one contact closure input for each of the contact closure outputs of the security system. Contact closure inputs are typically used to provide a simple communication means between two control systems, i.e., the lighting control system and the security system. For example, the security system may provide a contact closure input to the lighting control system in the event of an intrusion or a fire. The contact closure outputs of the security system are provided by a suitable switching device, such as, a relay or a transistor. Each contact closure output has two states: open (i.e., idle) or closed (i.e., asserted). The contact closure output signal is asserted by closing the switching device, i.e., electrically connecting the two terminals of the contact closure output.

The Homeworks lighting control system requires an advanced configuration procedure in order to implement the features of the system, e.g., the desired responses of the lighting control system in response to an intrusion or a fire. Often, a trained professional is required to program the desired functionality using a graphical user interface (GUI) software running on a personal computer (PC). The configuration procedures for many of the advanced features are rather complex and may involve programming using conditional logic.

Therefore, there exists a need for a simple lighting control system that can be coupled to a security system, but does not require an advanced configuration procedure in order to appropriately program the lighting control system to respond to the security system.

SUMMARY OF THE INVENTION

According to the present invention, a method of controlling the amount of power delivered to a plurality of electrical loads from an AC power source comprises the steps of: detecting a closure of a contact closure output; controlling the amount of power delivered to the plurality of electrical loads according to a first mode of operation in response to the step of detecting a closure; detecting if the contact closure output has remained closed for a predetermined amount of time; and controlling the amount of power delivered to the plurality of electrical loads according to a second mode of operation in response to the step of detecting if the contact closure output has remained closed for a predetermined amount of time. Preferably, the method further comprises the steps of detecting that the contact closure output is not closed; and controlling the amount of power delivered to the plurality of electrical loads according to a third mode of operation in response to the step of detecting that the contact closure output is not closed.

The present invention further provides a lighting control system for controlling the amount of power delivered from an AC power source to a plurality of electrical loads in response to a contact closure output. The system comprises a plurality of load control devices, each of which is adapted to be coupled between the AC power source and a respective one of the plurality of electrical loads, such that each of the load control devices is operable to control the amount of power delivered to the respective electrical load. The system further comprises a contact closure input adapted to be coupled to the contact closure output, and operable to detect a closure of the contact closure output. The plurality of load control devices are operable to control the amount of power delivered to the plurality of electrical loads according to a first mode of operation in response to the contact closure input detecting the closure of the contact closure output, and to control the amount of power delivered to the plurality of electrical loads according to a second mode of operation if the contact closure output has remained closed for a predetermined amount of time.

According to another embodiment of the present invention, a lighting control system for controlling the amount of power delivered from an AC power source to a plurality of electrical loads comprises a plurality of load control devices, a master control, and a signal repeater having a first contact closure input. Each of the load control devices is adapted to be coupled between the AC power source and a respective one of the plurality of electrical loads, such that each of the load control devices is operable to control the amount of power delivered to the respective electrical load. The master control includes a plurality of buttons and is operable to communicate wirelessly with the plurality of load control devices via an RF communication link. Each of the plurality of load control devices is responsive to actuations of the buttons of the master control. The signal repeater is operable to communicate wirelessly with the plurality of load control devices and the master control via the RF communication link. The first contact closure input of the signal repeater is adapted to be coupled to a first contact closure output. The load control devices and the signal repeater are programmed to behave out-of-box in a predetermined manner in response to the first contact closure input.

Other features and advantages of the present invention will become apparent from the following description of the invention that refers to the accompanying drawings.

DETAILED DESCRIPTION OF THE INVENTION

Figure 1:
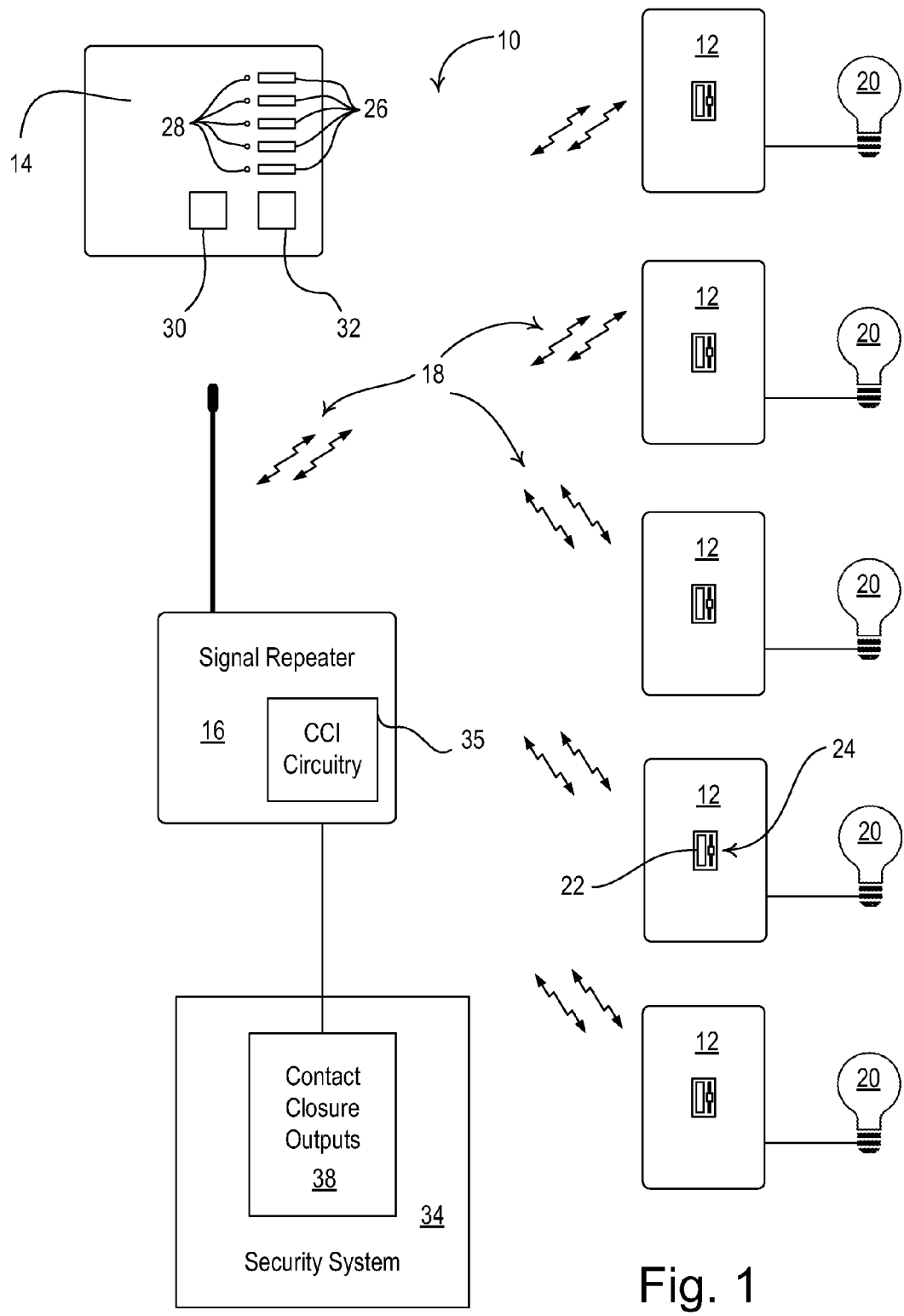
FIG. 1 is a simplified block diagram of a lighting control system according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 10 according to the present invention. The system 10 comprises a plurality of wireless dimmers 12, a master control 14, and a signal repeater 16, which all communicate with each other using radio-frequency (RF) signals 18, i.e., via an RF communication link. Alternatively, the dimmers 12, the master control 14, and the signal repeater 16 could be coupled to a wired communication link for transmitting and receiving command signals. Each dimmer 12 is connected between an AC power source and a respective lighting load 20 for control of the amount of power delivered from the AC power source to the lighting load. Each dimmer comprises a toggle actuator 22 and an intensity adjustment actuator 24 for respectively toggling the connected lighting load 20 on and off and adjusting the intensity of the connected lighting load. The signal repeater 16 initiates configuration procedures for the RF lighting control system 10 and helps to ensure error free communication by repeating the RF signals 18 such that every device of the system receives the RF signals.

The master control 14 comprises a plurality of dimmer buttons 26, a plurality of status indicators 28, an all-on button 30, and an all-off button 32. An actuation of the one of the dimmer buttons 26 causes a corresponding one of the lighting loads 20 to toggle between on and off. For example, a first one of the dimmers 12 is responsive to an actuation of a first button of the dimmer buttons 26; a second one of the dimmers 12 is responsive to an actuation of a second button of the dimmer buttons 26; and so on. An actuation of the all-on button causes the dimmers 12 to turn all of the lighting loads 20 on and an actuation of the all-off button causes the dimmers to turn all of the lighting loads off. The status indicators 28 are arranged with one status indicator next to each of the dimmer buttons 26, such that the status indicators are operable to provide feedback of the state of each of the corresponding dimmers 12 (i.e., on or off). The operation of the lighting control system 10 is described in greater detail in co-pending commonly-assigned U.S. patent application Ser. No. 11/446,876, filed Jun. 5, 2006, entitled REMOTE CONTROL LIGHTING CONTROL SYSTEM, now U.S. Pat. No. 7,498,952, issued Mar. 3, 2009, the entire disclosure of which is hereby incorporated by reference. Alternatively, the master control 14 may comprise any type of control device having at least one button operable to control the dimmers 12.

The lighting control system 10 is responsive to a security system 34. The signal repeater 16 comprises a contact closure input (CCI) circuitry 35, which includes a plurality of contact closure inputs (CCIs) 36, such that the lighting control system 10 is operable to receive contact closure output signals from a plurality of contact closure outputs (CCOs) 38 of the security system 34. According to the present invention, the lighting control system only includes a number M of contact closure inputs 36, but is operable to receive a number N of contact closure output signals, where N is greater than M and has a maximum of value of 2·M. For example, the lighting control system 10 may be operable to receive four contact closure output signals, but not more than six contact closure output signals, at three contact closure terminals, as will be described in greater detail with reference to FIG. 2.

Figure 2:
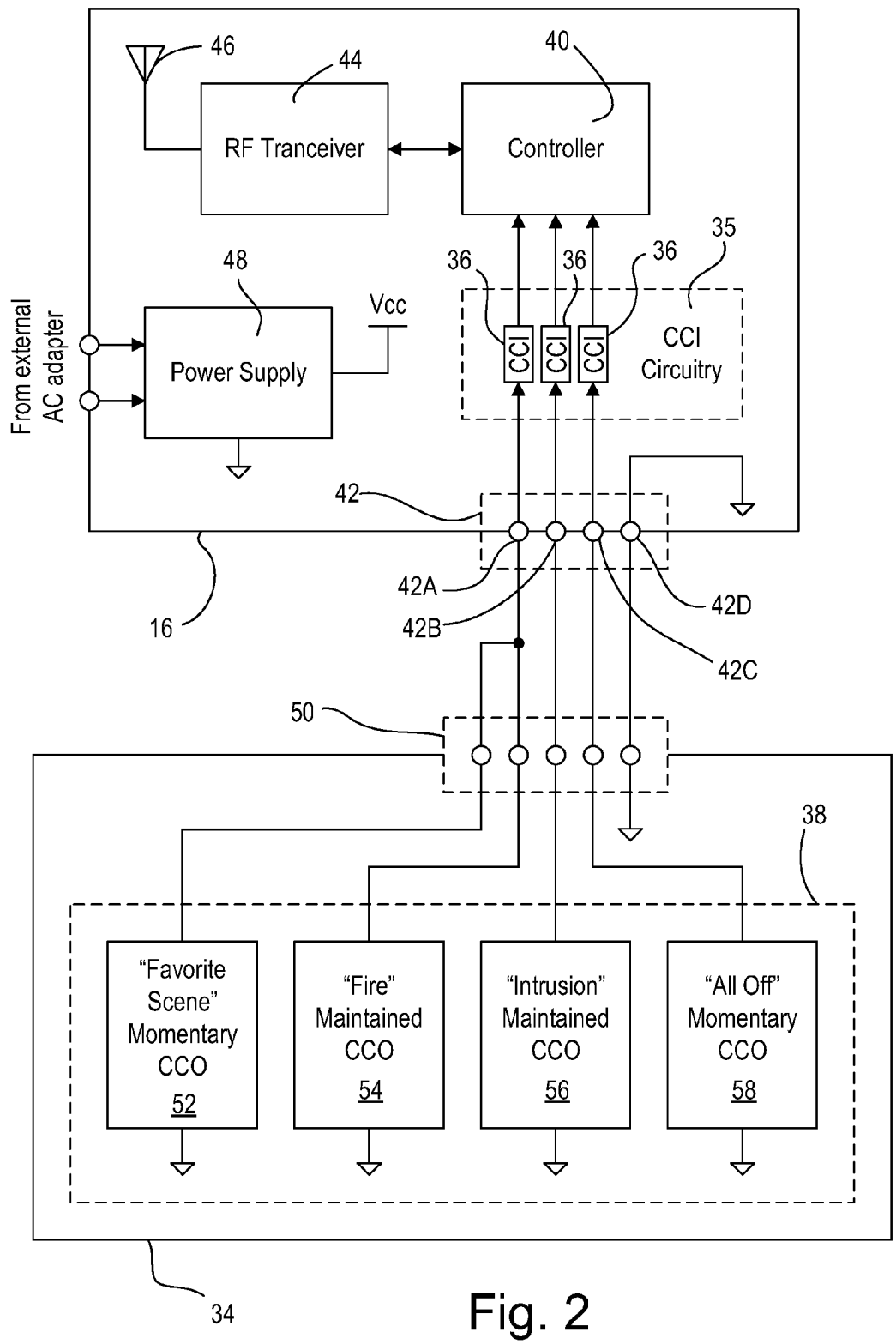
FIG. 2 is a simplified block diagram of a signal repeater of the lighting control system of FIG. 1, showing how the signal repeater is coupled to a security system.

FIG. 2 is a simplified block diagram of the signal repeater 16 and the security system 34 showing how the contact closure outputs 38 are preferably coupled to the contact closure inputs 36. The signal repeater 16 includes a controller 40, which is coupled to the contact closure inputs 36 for receipt of the contact closure output signals from the security system 34. The contact closure outputs signals are coupled to the signal repeater 16 at a CCI connector 42 (having input terminals 42A, 42B, 42C, 42D). An RF transceiver 44 is coupled to the controller 40 and an antenna 46, such that the controller 40 is operable to transmit and receive the RF signals 18 of the lighting control system 10. A power supply 48 preferably receives a direct-current (DC) voltage from an external AC adapter (not shown) and generates a low-magnitude DC voltage $V_{CC}$ for powering the controller 40 and the RF transceiver 44.

The security system 34 provides the contact closure outputs 38 at a CCO connector 50. There are two types of contact closure outputs 38: momentary and maintained. For a momentary contact closure output, the closure of the contact closure output (i.e., the time when the CCO terminals are electrically connected) is a relatively short period of time, e.g., one (1) second. A momentary contact closure output may occur, for example, when a guest has pressed a call button at a security gate or a user has pressed a button on an electronic key fob (i.e., a keychain with one or more programmable actuators) of the security system 34 to activate a "favorite scene" (i.e., a favorite lighting preset). For the lighting control system 10, the favorite scene preferably corresponds to the lighting intensity levels determined by the positions of the intensity adjustment actuators 24 of the dimmers 12.

For a maintained contact closure output, the closure of the contact closure output is provided for a substantially longer time than that of the momentary contact closure output, e.g., approximately six (6) seconds or greater. A maintained contact closure output may occur during an intrusion event or a fire event, when a room is occupied, or when a window is open. Typically, a momentary contact closure output and a maintained contact closure output are wired to different contact closure inputs. However, the present invention allows a momentary contact closure output and a maintained contact closure output to be wired to the same contact closure input. The present invention is not limited by the example of the length of the maintained contact closure output provided, i.e., six seconds. The maintained contact closure output may be closed for as few as approximately three (3) seconds.

The contact closure outputs 38 of the security system 34 include four separate contact closure outputs: a "favorite scene" momentary CCO 52, a "fire" maintained CCO 54, an "intrusion" maintained CCO 56, and an "all-off" momentary CCO 58. The favorite scene momentary CCO 52 and the "all-off" momentary CCO 58 are closed, for example, when buttons on a key fob are actuated. The fire maintained CCO 54 and the intrusion maintained CCO 56 are provided when the security system 34 detects respectively a fire event or an intrusion event, and are both maintained closed as long as the security system 34 detects the event for a substantially long period of time, for example, greater than one minute.

Preferably, the lighting control system 10 responds to contact closure output signals in a predetermined fashion when the lighting control system 10 is first installed and powered up, i.e., with an "out-of-box" setting. Specifically, in response to a closure of "favorite scene" momentary CCO 52, the dimmers 12 control the intensities of the lighting loads 20 according to the positions of the corresponding intensity adjustment actuators 24. In response to a closure of the "all-off" momentary CCO 58, the dimmers 12 turn off the lighting loads 20. In response to a closure of the "fire" maintained CCO 54, the lighting control system 10 causes a specific one of the dimmers 12 to flash the connected lighting load 20, while causing the other dimmers 12 to the intensities according to the positions of the corresponding intensity adjustment actuators 24. In response to a closure of the "intrusion" maintained CCO 56, the lighting control system 10 causes the specific one of the dimmers 12 to flash the connected lighting load 20 and the other dimmers 12 to control the lighting loads 20 to full intensity. For both the cases of the "fire" maintained CCO 54 and the "intrusion" maintained CCO 56, the lighting load 20 connected to the specific one of the dimmer 12 is preferably located external to the home, such that the flashing lighting load is visible to emergency officers.

According to the present invention, a momentary contact closure output and a maintained contact closure output are operable to be coupled to a single contact closure input terminal. As shown in FIG. 2, the "favorite scene" momentary CCO 52 and the "fire" maintained CCO 54 are both coupled to the first CCI terminal 42A of the CCI connector 42. Further, the "intrusion" maintained CCO 56 is connected to the second CCI terminal 42B and the "all-off" momentary CCO 58 is connected to the third CCI terminal 42C. A circuit common (which each of the contact closure output signals are referenced to) is connected to the fourth CCI terminal 42D.

Figure 3A:
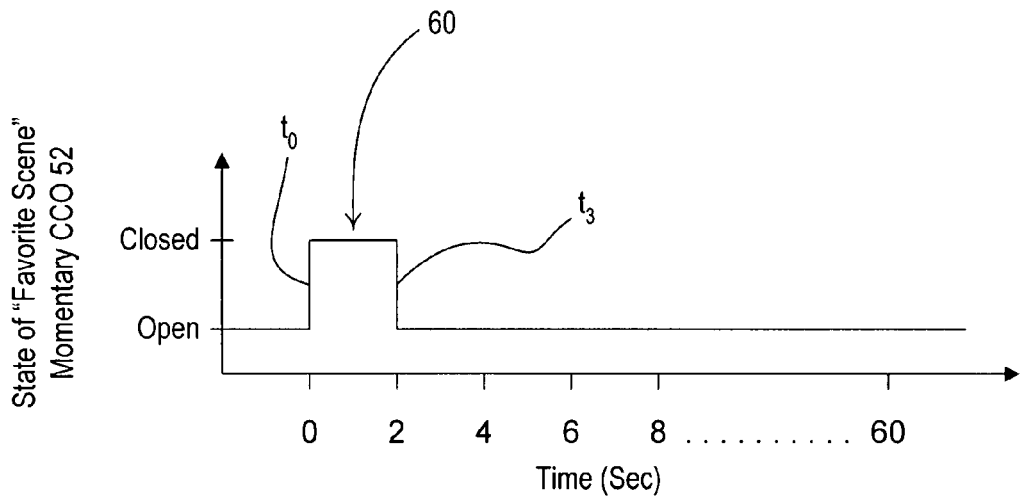
FIG. 3A is a timing diagram of a "favorite scene" contact closure output signal provided by a "favorite scene" momentary contact closure output of the security system of FIG. 2.
Figure 3B:
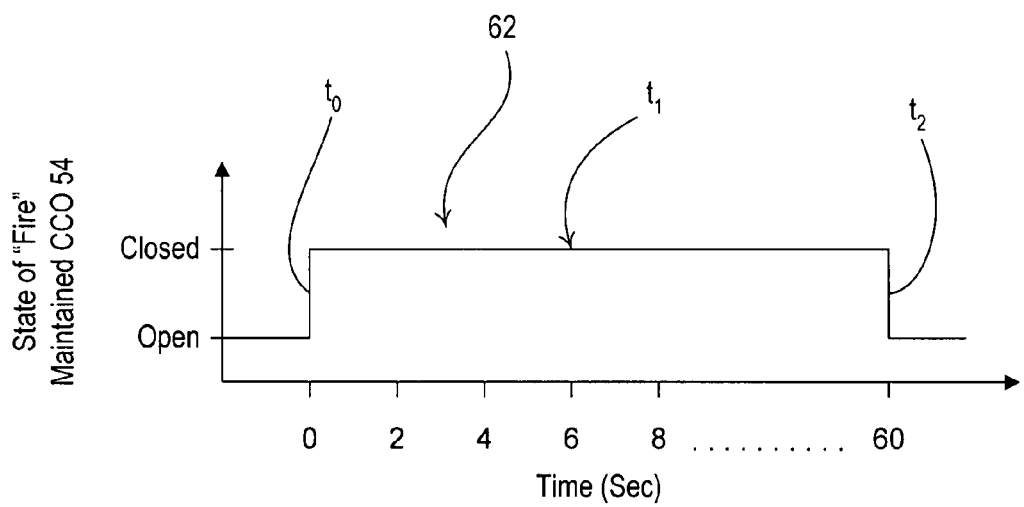
FIG. 3B is a timing diagram of a "fire" contact closure output signal provided by a "fire" maintained contact closure output of the security system of FIG. 2.

FIG. 3A and FIG. 3B are timing diagrams of a "favorite scene" CCO signal 60 and a "fire" CCO signal 62 provided by the "favorite scene" momentary CCO 52 and the "fire" maintained CCO 54, respectively. The "favorite scene" momentary CCO 52 is closed for a transitory (or momentary) duration, e.g., for less than six (6) seconds, while the "fire" maintained CCO 54 is asserted for a longer (or maintained) duration, e.g., for greater than six (6) seconds. Therefore, the lighting control system 10 is able to distinguish between the contact closure output signals provided by the "favorite scene" momentary CCO 52 and the "fire" maintained CCO 54.

Figure 4:
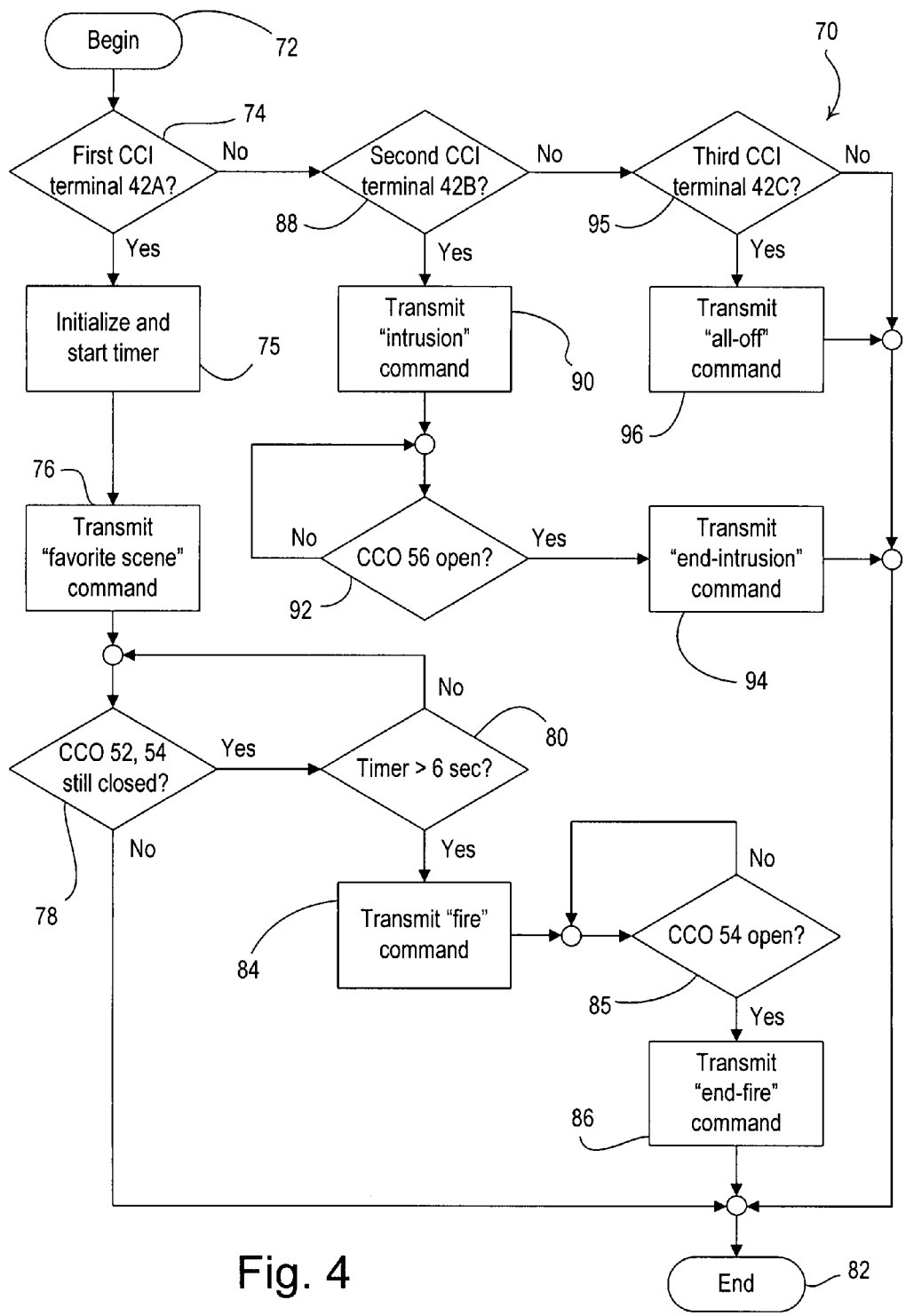
FIG. 4 is a flowchart of a contact closure input procedure executed by the signal repeater according to the present invention.

FIG. 4 is a flowchart of a contact closure input procedure 70 executed by the signal repeater 16 according to the present invention. The procedure 70 begins at step 72 when a closure of one of the contact closure outputs 38 is detected at the contact closure inputs 36 of the signal repeater 16. If a closure is detected on the first CCI terminal 42A at step 74 (i.e., a closure of either the "favorite scene" momentary CCO 52 or the "fire" maintained CCO 54 as shown at time to in FIGS. 3A and 3B), a timer is initialized to zero and begins to increase in value with time at step 75. In response to detecting the closure on the first CCI terminal 42A at step 74, the signal repeater 16 further transmits a "favorite scene" command to the dimmers 12 at step 76. After receiving the "favorite scene" command, each of the dimmers 12 controls the intensity of the connected lighting load 20 to according to the position of the intensity adjustment actuator 24, i.e., the lighting control system 10 operates in a first mode of operation.

If the either of the "favorite scene" momentary CCO 52 or the "fire" maintained CCO 54 is still closed at step 78, a determination is made at step 80 as to whether the timer has exceeded a predetermined amount of time, e.g., six (6) seconds. If the timer has not exceeded six (6) seconds at step 80 and the closure is open at step 78 (i.e., the "favorite scene" momentary CCO 52 is open before six (6) seconds has expired as shown in FIG. 3A), the procedure 70 exits at step 82 with the lighting loads 20 at the "favorite scene" intensity levels.

However, if the CCO is still closed at step 78 and the timer has exceeded six (6) seconds at step 80 (i.e., the "fire" maintained CCO 54 is closed at time ti as shown in FIG. 3B), the signal repeater 16 transmits a "fire" command at step 84. In response to receiving the "fire" command, a specific one of the dimmers 12 flashes the connected lighting load 20 and the other dimmers 12 control the lighting loads 20 according to the positions of the intensity adjustment actuators 24, i.e., the lighting control system 10 operates in a second mode of operation. Next, the procedure 70 loops until the "fire" maintained CCO 54 is open at step 85, at which time, the signal repeater 16 transmits an "end-fire" command at step 86. Preferably, the dimmers 12 cease the operation performed in response to the "fire" command by causing the one of the dimmer 12 to stop flashing and to control the connected lighting load 20 to the intensity level determined by the position of the intensity adjustment actuator 24, i.e., the lighting control system 10 operates in a third mode of operation. The procedure 70 then exits at step 82.

If a closure on the first CCI terminal 42A is not detected at step 74, but a closure of the second CCI terminal 42B has been detected at step 88 (i.e., corresponding to a closure of the "intrusion" maintained CCO 56), the signal repeater 16 transmits an "intrusion" command at step 90. In response to receiving the "intrusion" command, a specific one of the dimmers 12 flashes the connected lighting load 20, while the other dimmers 12 control the lighting loads 20 to full intensity. The procedure 70 now waits while the "intrusion" maintained CCO 56 is closed until the CCO 56 is open at step 92, at which time, the signal repeater 16 transmits an "end-intrusion" command and the procedure 70 exits at step 82.

If a closure on the first CCI terminal 42A is not detected at step 74 or a closure on the second CCI terminal 42B is not detected at step 88, a determination is made at step 95 as whether as to whether a closure has been detected on the third CCI terminal 42C (i.e., corresponding to a closure of the "all-off" momentary CCO 60). If so, the signal repeater 16 transmits an "all-off" command to the dimmers 12 at step 96. Accordingly, the dimmers 12 turn off the connected lighting loads 20. If a closure is not detected on any of the CCI terminals 42A, 42B, 42C, the procedure 70 simply exits at step 82.

Preferably, the lighting control system 10 responds similarly to closures of a momentary contact closure output and a maintained contact closure output that are coupled to the same CCI terminal. For example, in the lighting control system 10, the response to a closure of the "favorite scene" momentary CCO 52 is to control the intensities of the lighting loads 20 according to the positions of the intensity adjustment actuators 24, while the response to a closure of the "fire" maintained CCO 54 is to flash one lighting load 20 and to control the other lighting loads according to the positions of the intensity adjustment actuators. Therefore, when the signal repeater 16 determines that the "fire" maintained CCO 54 is closed (i.e., at step 80), the favorite scene is already selected. At this time, the one specific dimmer 12 simply begins to flash.

Alternatively, the signal repeater could initialize and start the timer (step 75) and transmit the "favorite scene" command (step 76) in response to detecting a "release" at the first CCI terminal 42A (i.e., when the "favorite scene" CCO signal 60 transitions from the closed state to the open state as shown at time $t_3$ in FIG. 3A) rather than detecting at step 74 a closure of either the "favorite scene" momentary CCO 52 or the "fire" maintained CCO 54 (i.e., at time $t_0$ in FIGS. 3A and 3B).

Figure 5:
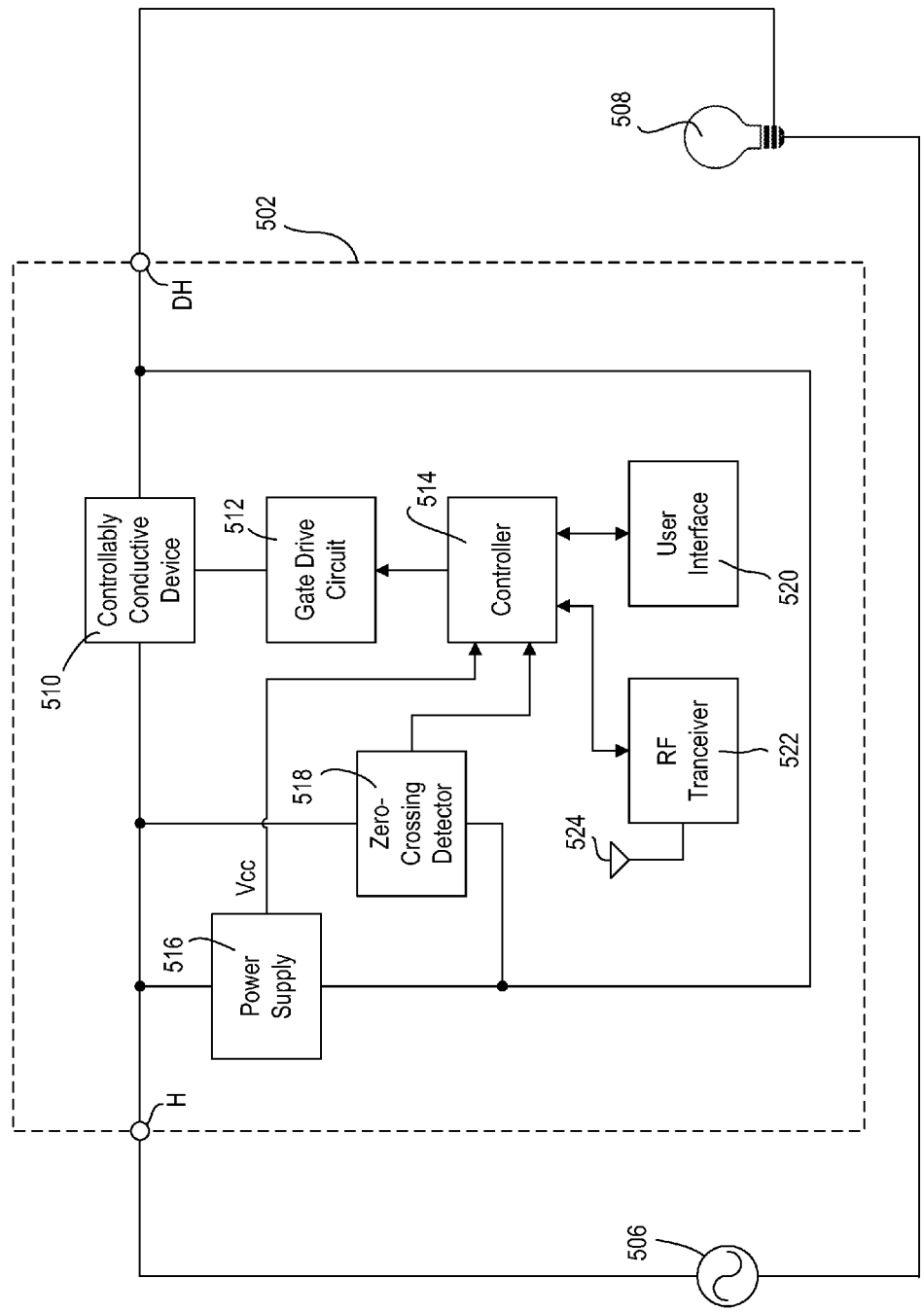
FIG. 5 is a simplified block diagram of an intelligent dimmer 102 that can be used in the lighting control system of FIG. 1.

FIG. 5 is a simplified block diagram of an intelligent dimmer 502 that can be used in the lighting control system 10. The dimmer 502 is coupled between an AC voltage source 506 and a lighting load 508. The dimmer 502 includes a controllably conductive device 510, such as a bidirectional semiconductor switch, for example, a triac. The controllably conductive device 510 may also be implemented as a relay or another type of semiconductor switch, such as two field effect transistors (FETs) in anti-series connection, a FET in a rectifier bridge, or one or more insulated gate bipolar junction transistors (IGBTs). The controllably conductive device 510 has a control input (or gate), which is connected to a gate drive circuit 512. The input to the gate renders the controllably conductive device 510 selectively conductive or non-conductive, which in turn controls the power supplied to the lighting load 508.

The gate drive circuit 512 provides control inputs to the controllably conductive device 510 in response to command signals from a controller 514. The controller 514 is preferably implemented as a microcontroller, but may be any suitable processing device, such as a programmable logic device (PLD), a microprocessor, or an application specific integrated circuit (ASIC). A power supply 516 is coupled across the controllably conductive device 510 and generates a DC voltage $V_{CC}$ to power the controller 514. The power supply 516 is only able to charge when the controllably conductive device 510 is non-conductive and there is a voltage potential developed across the dimmer 102.

A zero-crossing detector 518 determines the zero-crossing points of the AC voltage source 506 and provides this information to the controller 514. A zero-crossing is defined as the time at which the AC supply voltage transitions from positive to negative polarity, or from negative to positive polarity, at the beginning of each line voltage half-cycle. The controller 514 determines when to turn on (or turn off) the controllably conductive device 510 each half-cycle by timing from each zero-crossing of the AC supply voltage.

A user interface 520 is coupled to the controller 514 and provides a plurality of buttons for receiving inputs from a user and a plurality of light emitting diodes (LEDs) for providing feedback to the user. The dimmer 502 further includes an RF transceiver 522 for transmitting and receiving RF communication signals from the other devices of the system 10 via an antenna 524.

Even though the lighting control system 10 has been shown as having a momentary contact closure output and a maintained contact closure output connected to one of the CCI terminals (i.e., the first CCI terminal 42A), two contact closure outputs could be simultaneously be coupled to any or all of the CCI terminals 42A, 42B, 42C. The lighting control system 10 could include any number of contact closure input terminals.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of controlling the amount of power delivered to a plurality of electrical loads from an AC power source, the method comprising the steps of:
   detecting a closure of a contact closure output;
   controlling the amount of power delivered to the plurality of electrical loads according to a first mode of operation in response to the step of detecting a closure;
   detecting if the contact closure output has remained closed for a predetermined amount of time; and
   controlling the amount of power delivered to the plurality of electrical loads according to a second mode of operation in response to the step of detecting if the contact closure output has remained closed for a predetermined amount of time.

2. The method of claim 1, further comprising the steps of:
   detecting that the contact closure output is not closed after the step of detecting if the contact closure output has remained closed for a predetermined amount of time; and
   controlling the amount of power delivered to the plurality of electrical loads according to a third mode of operation in response to the step of detecting that the contact closure output is not closed.

3. The method of claim 2, wherein the electrical loads comprise lighting loads.

4. The method of claim 3, wherein the step of controlling the amount of power delivered to the plurality of electrical loads according to a first mode of operation comprises controlling the intensity of each of the lighting loads to a preset intensity level.

5. The method of claim 4, wherein the step of controlling the amount of power delivered to the plurality of electrical loads according to a second mode of operation comprises flashing one of the lighting loads and controlling the intensity of each of the other lighting loads to the preset intensity level.

6. The method of claim 5, wherein the step of controlling the amount of power delivered to the plurality of electrical loads according to a third mode of operation comprises ceasing the step of flashing one of the lighting loads and controlling the intensity of each of the other lighting loads to the preset intensity level.

7. The method of claim 2, wherein the predetermined amount of time is greater than approximately three seconds.

8. The method of claim 7, wherein the predetermined amount of time is approximately six seconds.

9. A lighting control system for controlling the amount of power delivered from an AC power source to a plurality of electrical loads in response to a contact closure output, the system comprising:
- a plurality of load control devices, each of the load control devices adapted to be coupled between the AC power source and a respective one of the plurality of electrical loads, each of the load control devices operable to control the amount of power delivered to the respective electrical load;
- a contact closure input adapted to be coupled to the contact closure output, and operable to detect a closure of the contact closure output;
- wherein the plurality of load control devices are operable to control the amount of power delivered to the plurality of electrical loads according to a first mode of operation in response to the contact closure input detecting the closure of the contact closure output, and to control the amount of power delivered to the plurality of electrical loads according to a second mode of operation if the contact closure output has remained closed for a predetermined amount of time.

10. The system of claim 9, wherein the contact closure input is further operable to detect that the contact closure output is not closed after detecting that the contact closure output remained closed for the predetermined amount of time, and the plurality of load control devices are operable to control the amount of power delivered to the plurality of electrical loads according to a third mode of operation in response to the contact closure input detecting that the contact closure output is not closed.

11. The system of claim 10, wherein the electrical loads comprise lighting loads, and the load control devices are operable to control the intensities of the lighting loads.

12. The system of claim 11, wherein the first mode of operation comprises controlling the intensity of each of the lighting loads to a preset intensity level.

13. The system of claim 12, wherein the second mode of operation comprises flashing one of the lighting loads and controlling the intensity of each of the other lighting loads to the preset intensity level.

14. The system of claim 13, wherein the third mode of operation comprises ceasing flashing one of the lighting loads and controlling the intensity of each of the other lighting loads to the preset intensity level.

15. The system of claim 12, wherein each load control device comprises an intensity adjustment actuator to set the preset intensity level and each load control device is operable to control the intensity of each of the lighting loads to the preset intensity level in response to the position of the intensity adjustment actuator.

16. The system of claim 10, further comprising:
- a signal repeater operable to communicate with the plurality of load control devices via a communication link, the signal repeater including the contact closure input, such that the signal repeater is operable to transmit a command signal to the load control devices in response to the contact closure input.

17. The system of claim 16, further comprising:
- a master control including a plurality of buttons, the master control operable to communicate with the plurality of load control devices and the signal repeater via the communication link;
- wherein the load control devices are responsive to actuations of the buttons of the master control.

18. The system of claim 16, wherein the communication link comprises an RF communication link.

19. The system of claim 16, wherein the communication link comprises a wired communication link.

20. The system of claim 10, wherein the contact closure input is operable to be simultaneously coupled to a momentary contact closure output and a maintained contact closure output.

21. A lighting control system for controlling the amount of power delivered from an AC power source to a plurality of electrical loads, the system comprising:
- a plurality of load control devices, each of the load control devices adapted to be coupled between the AC power source and a respective one of the plurality of electrical loads, each of the load control devices operable to control the amount of power delivered to the respective electrical load;
- a master control including a plurality of buttons, the master control operable to communicate wirelessly with the plurality of load control devices via an RF communication link, each of the plurality of load control devices responsive to actuations of the buttons of the master control; and
- a signal repeater operable to communicate wirelessly with the plurality of load control devices and the master control via the RF communication link, the signal repeater including a first contact closure input adapted to be coupled to a first contact closure output generated external to the signal repeater;
- wherein the load control devices and the signal repeater are programmed to operate when first installed and powered up in a predetermined manner in response to the first contact closure input.

22. The system of claim 21, wherein the signal repeater is operable to detect a closure of the first contact closure output at the first contact closure input, and to detect if the first contact closure output has remained closed for a predetermined amount of time, the signal repeater operable to transmit a command signal to the load control devices in response to the first contact closure input; and
- wherein the plurality of load control devices are operable to control the amount of power delivered to the plurality of electrical loads according to a first mode of operation in response to the first contact closure input detecting the closure of the first contact closure output, and to control the amount of power delivered to the plurality of electrical loads according to a second mode of operation in response to the first contact closure input detecting if the first contact closure output has remained closed for the predetermined amount of time.

23. The system of claim 22, wherein the first contact closure input is operable to be simultaneously coupled to a first momentary contact closure output and a first maintained contact closure output; and
- wherein the signal repeater further comprises a second contact closure input adapted to be coupled to a second contact closure output and a third contact closure input adapted to be coupled to a third contact closure output.

24. The system of claim 23, wherein the electrical loads comprise lighting loads, and the first momentary contact closure output, the first maintained contact closure output, the second contact closure output, and the third contact closure output are provided by a security system.

25. The system of claim 24, wherein the first maintained contact closure output is representative of a fire event and the second contact closure output is representative of an intrusion event, and each of the load control devices is operable to control the intensities of the lighting loads to a favorite scene level in response to a closure of the first momentary contact closure output and to an off level in response to a closure of the third contact closure output.

26. The system of claim 22, wherein the first contact closure input is further operable to detect that the first contact closure output is not closed after detecting that the contact closure output remained closed for the predetermined amount of time, and the plurality of load control devices are operable to control the amount of power delivered to the plurality of electrical loads according to a third mode of operation in response to the first contact closure input detecting that the first contact closure output is not closed.

* * * * *